(12) United States Patent
Sproule et al.

(10) Patent No.: US 10,552,446 B2
(45) Date of Patent: Feb. 4, 2020

(54) LEVERAGING SOCIAL GRAPHS WITH GAME PLAY AUTO-NEIGHBORING

(71) Applicant: Zynga Inc., San Francisco, CA (US)

(72) Inventors: Dylan Sproule, San Francisco, CA (US); Shane Hall, San Francisco, CA (US); Ben Hall, Fairfield, CA (US); Timothy J. O. Catlin, San Mateo, CA (US); Jason Paul Allen, Seattle, WA (US); Clayton Rhodes Stark, Victoria (CA)

(73) Assignee: Zynga Inc., San Francisco, CA (US)

( * ) Notice: Subject to any disclaimer, the term of this patent is extended or adjusted under 35 U.S.C. 154(b) by 206 days.

(21) Appl. No.: 13/782,108

(22) Filed: Mar. 1, 2013

(65) Prior Publication Data

US 2013/0231179 A1    Sep. 5, 2013

Related U.S. Application Data

(60) Provisional application No. 61/605,606, filed on Mar. 1, 2012.

(51) Int. Cl.
G06F 16/27    (2019.01)

(52) U.S. Cl.
CPC .......... *G06F 16/27* (2019.01); *A63F 2300/55* (2013.01)

(58) Field of Classification Search
CPC ...... A63F 2300/5566; A63F 2300/5546; A63F 2300/556

(Continued)

(56) References Cited

U.S. PATENT DOCUMENTS 6,128,660 A * 10/2000 Grimm et al. ................. 709/227
6,134,590 A * 10/2000 Perlman ........................ 709/228

(Continued)

FOREIGN PATENT DOCUMENTS

WO    WO-2013016687 A1    1/2013

OTHER PUBLICATIONS

"U.S. Appl. No. 13/077,690, Examiners Interview Summary dated Nov. 14, 2012", 3 pgs.

(Continued)

*Primary Examiner* — Tramar Y Harper
*Assistant Examiner* — Jeffrey K Wong
(74) *Attorney, Agent, or Firm* — Schwegman Lundberg & Woessner, P.A.

(57) ABSTRACT

Techniques for automatically establishing connections between users within a gaming social network, designed for connecting users having common gaming interests, social connections, or characteristics. Embodiments include methods for automatically establishing connections from members of an out-of-game social network, the gaming social network, and gaming activity participants; evaluating user profile information and user characteristics in a gaming social network and gaming activity in a game networking system to determine an appropriate set of connections for a selected user. Embodiments include systems configured to automatically establish and maintain connections between players in a gaming social network based on gaming activity in a gaming networking system and social relationship information retrieved from one or more social networks where the players have a social relationship.

19 Claims, 10 Drawing Sheets

(58) Field of Classification Search
USPC .......................................................... 463/29
See application file for complete search history.

(56) References Cited

U.S. PATENT DOCUMENTS

| | | | | |
|---|---|---|---|---|
| 6,345,297 | B1* | 2/2002 | Grimm et al. | 709/227 |
| 6,641,481 | B1* | 11/2003 | Mai et al. | 463/42 |
| 7,614,955 | B2* | 11/2009 | Farnham et al. | 463/42 |
| 7,819,749 | B1* | 10/2010 | Fish | G07F 17/3227 463/42 |
| 8,262,468 | B1 | 9/2012 | Vanbragt et al. | |
| 8,843,491 | B1* | 9/2014 | Mazniker | G06F 17/30867 707/737 |
| 9,700,803 | B2 | 7/2017 | Hall et al. | |
| 2004/0097287 | A1 | 5/2004 | Postrel | |
| 2005/0070359 | A1* | 3/2005 | Rodriquez et al. | 463/42 |
| 2006/0135264 | A1* | 6/2006 | Shaw et al. | 463/42 |
| 2006/0270419 | A1 | 11/2006 | Crowley et al. | |
| 2006/0287096 | A1* | 12/2006 | O'Kelley et al. | 463/42 |
| 2006/0287099 | A1* | 12/2006 | Shaw et al. | 463/42 |
| 2007/0173323 | A1 | 7/2007 | Johnson et al. | |
| 2008/0004117 | A1 | 1/2008 | Stamper et al. | |
| 2008/0256015 | A1* | 10/2008 | Woolf et al. | 706/48 |
| 2009/0005172 | A1* | 1/2009 | Shibahara | A63F 13/12 463/42 |
| 2009/0030932 | A1* | 1/2009 | Harik | G06Q 10/10 |
| 2009/0075738 | A1* | 3/2009 | Pearce | G07F 17/32 463/42 |
| 2009/0197681 | A1 | 8/2009 | Krishnamoorthy et al. | |
| 2009/0239668 | A1* | 9/2009 | Han | 463/42 |
| 2009/0265242 | A1* | 10/2009 | Horvitz et al. | 705/14.52 |
| 2009/0281988 | A1 | 11/2009 | Yoo | |
| 2009/0319304 | A1 | 12/2009 | Smith | |
| 2009/0325709 | A1* | 12/2009 | Shi | 463/42 |
| 2010/0094863 | A1 | 4/2010 | Kenton-dau et al. | |
| 2010/0218128 | A1 | 8/2010 | Bonat et al. | |
| 2010/0306672 | A1* | 12/2010 | McEniry | G06Q 10/10 715/753 |
| 2011/0246907 | A1 | 10/2011 | Wang et al. | |
| 2011/0250971 | A1* | 10/2011 | van Os et al. | 463/42 |
| 2011/0275442 | A1* | 11/2011 | Hawkins | A63F 13/30 463/42 |
| 2011/0276631 | A1* | 11/2011 | Schmitt | G06Q 10/105 709/205 |
| 2011/0307551 | A1* | 12/2011 | Danezis et al. | 709/204 |
| 2011/0319175 | A1* | 12/2011 | Jensen | 463/42 |
| 2012/0041907 | A1 | 2/2012 | Wang et al. | |
| 2012/0054275 | A1* | 3/2012 | Channell | G06Q 30/02 709/204 |
| 2012/0072382 | A1* | 3/2012 | Pearson | G06Q 10/00 706/13 |
| 2012/0094762 | A1* | 4/2012 | Khan | G06Q 10/101 463/42 |
| 2012/0096002 | A1* | 4/2012 | Sheehan | G06Q 50/01 707/737 |
| 2012/0110678 | A1* | 5/2012 | Kumble | G06F 21/10 726/28 |
| 2012/0122588 | A1* | 5/2012 | Berger | A63F 13/12 463/42 |
| 2012/0142429 | A1* | 6/2012 | Muller | 463/42 |
| 2012/0202587 | A1* | 8/2012 | Allen et al. | 463/25 |
| 2012/0215865 | A1* | 8/2012 | Sacks | G06Q 50/01 709/206 |
| 2012/0225720 | A1* | 9/2012 | Baszucki | 463/42 |
| 2012/0225723 | A1* | 9/2012 | Webster | A63F 13/795 463/42 |
| 2012/0225724 | A1* | 9/2012 | Barber et al. | 463/42 |
| 2012/0226749 | A1* | 9/2012 | Dale | G06Q 50/01 709/204 |
| 2012/0252579 | A1 | 10/2012 | Sethi et al. | |
| 2012/0264520 | A1 | 10/2012 | Marsland et al. | |
| 2012/0302350 | A1* | 11/2012 | Murphy | H04L 67/38 463/42 |
| 2012/0302351 | A1* | 11/2012 | Murphy | A63F 13/12 463/42 |
| 2012/0309538 | A1* | 12/2012 | Murphy et al. | 463/42 |
| 2012/0309539 | A1* | 12/2012 | Smith et al. | 463/42 |
| 2012/0323686 | A1* | 12/2012 | Burger | G06F 21/316 705/14.55 |
| 2013/0007013 | A1* | 1/2013 | Geisner | A63F 13/12 707/748 |
| 2013/0035164 | A1* | 2/2013 | Osvald | A63F 13/12 463/42 |
| 2013/0035989 | A1* | 2/2013 | Brown et al. | 705/7.33 |
| 2013/0041916 | A1* | 2/2013 | Biesecker et al. | 707/769 |
| 2013/0041949 | A1* | 2/2013 | Biesecker et al. | 709/204 |
| 2013/0165234 | A1 | 6/2013 | Hall et al. | |
| 2013/0172085 | A1* | 7/2013 | Harrington | G06Q 50/01 463/42 |
| 2015/0169571 | A1* | 6/2015 | Farago | G06F 17/3053 707/723 |
| 2016/0199740 | A1 | 7/2016 | Hall et al. | |
| 2017/0296930 | A1 | 10/2017 | Hall et al. | |

OTHER PUBLICATIONS

"U.S. Appl. No. 13/077,690, Non Final Office Action dated Aug. 16, 2012", 20 pgs.

"U.S. Appl. No. 13/077,690, Response filed Jun. 19, 2012 to Restriction Requirement dated May 25, 2012", 12 pgs.

"U.S. Appl. No. 13/077,690, Response filed Nov. 16, 2012 to Non Final Office Action dated Aug. 16, 2012", 14 pgs.

"U.S. Appl. No. 13/077,690, Restriction Requirement dated May 25, 2012", 5 pgs.

"U.S. Appl. No. 13/244,743, Examiner Interview Summary dated Nov. 9, 2012", 3 pgs.

"U.S. Appl. No. 13/244,743, Non Final Office Action dated Aug. 16, 2012", 15 pgs.

"U.S. Appl. No. 13/244,743, Response filed Jun. 25, 2012 to Restriction Requirement dated May 24, 2012", 9 pgs.

"U.S. Appl. No. 13/244,743, Response filed Nov. 16, 2012 to Non Final Office Action dated Aug. 16, 2012", 10 pgs.

"U.S. Appl. No. 13/244,743, Restriction Requirement dated May 24, 2012", 6 pgs.

"International Application Serial No. PCT/US2012/048691, Search Report dated Oct. 16, 2012", 2 pgs.

"International Application Serial No. PCT/US2012/048691, Written Opinion dated Oct. 16, 2012", 4 pgs.

Badgeunlock, "Foursquare Badge—Entourage", [Online] Retrieved from the internet http://www.badgeunlock.com/201 0/08/foursquare-badge-entourage-retiredsxsw-2009/, (Aug. 9, 2010), 2 pgs.

"U.S. Appl. No. 13/560,838, Non Final Office Action dated Apr. 25, 2014", 7 pgs.

"International Application Serial No. PCT/US2012/048691, International Preliminary Report on Patentability dated Feb. 6, 2014", 6 pgs.

U.S. Appl. No. 13/560,838, filed Jul. 27, 2012, Method and System for Matchmaking Connections Within a Gaming Social Network.

"U.S. Appl. No. 13/560,838, Final Office Action dated Jan. 2, 2015", 7 pgs.

"U.S. Appl. No. 13/560,838, Response filed Aug. 21, 2014 to Non-Final Office Action dated Apr. 25, 2014", 12 pgs.

"U.S. Appl. No. 13/560,838, Non Final Office Action dated May 21, 2015", 8 pgs.

"U.S. Appl. No. 13/560,838, Notice of Allowance dated Nov. 6, 2015", 5 pgs.

"U.S. Appl. No. 13/560,838, Response filed May 4, 2015 to Non Final Office Action dated Jan. 2, 2015", 10 pgs.

"U.S. Appl. No. 13/560,838, Response filed Sep. 21, 2015 to Non Final Office Action dated May 21, 2015", 26 pgs.

"U.S. Appl. No. 15/075,943, Non Final Office Action dated Jul. 28, 2016", 9 pgs.

"U.S. Appl. No. 15/075,943, Notice of Allowance dated Mar. 6, 2017", 5 pgs.

"U.S. Appl. No. 15/075,943, Response filed Jan. 30, 2017 to Non Final Office Action dated Jul. 28, 2016", 17 pgs.

(56) References Cited

OTHER PUBLICATIONS

"U.S. Appl. No. 15/075,943, Corrected Notice of Allowance dated Jun. 2, 2017", 2 pgs.
"U.S. Appl. No. 15/637,341, Non Final Office Action dated Oct. 4, 2018", 11 pgs.
"U.S. Appl. No. 15/637,341, Preliminary Amendment filed Jul. 14, 2017", 7 pgs.
"U.S. Appl. No. 15/637,341, Response filed Mar. 4, 2019 to Non Final Office Action dated Oct. 4, 2018", 13 pgs.
U.S. Appl. No. 15/637,341, filed Jun. 29, 2017, Method and System for Matchmaking Connections Within a Gaming Social Network.

* cited by examiner

LEVERAGING SOCIAL GRAPHS WITH GAME PLAY AUTO-NEIGHBORING

CLAIM OF PRIORITY

This patent application claims the benefit of priority of Dylan Sproule, et al. U.S. Provisional Patent Application Ser. No. 61/605,606, titled "LEVERAGING SOCIAL GRAPHS WITH GAME PLAY AUTO-NEIGHBORING," filed on Mar. 1, 2012, which is hereby incorporated by reference herein in its entirety.

CROSS-REFERENCE TO RELATED PATENT DOCUMENTS

This patent application is also related to Shane Hall et al. U.S. patent application Ser. No. 13/560,838, titled "METHOD AND SYSTEM FOR MATCHMAKING CONNECTIONS WITHIN A GAMING SOCIAL NETWORK," filed on Jul. 27, 2012, which is hereby incorporated by reference herein in its entirety.

TECHNICAL FIELD

The present disclosure generally relates to games and applications in general and, in particular embodiments, to computer-implemented social or gaming networks operating in connection with the games and applications.

BRIEF DESCRIPTION OF THE DRAWINGS

Some embodiments are illustrated by way of example and not limitation in the figures of the accompanying drawings.

DESCRIPTION OF EXAMPLE EMBODIMENTS

Figure 1A:
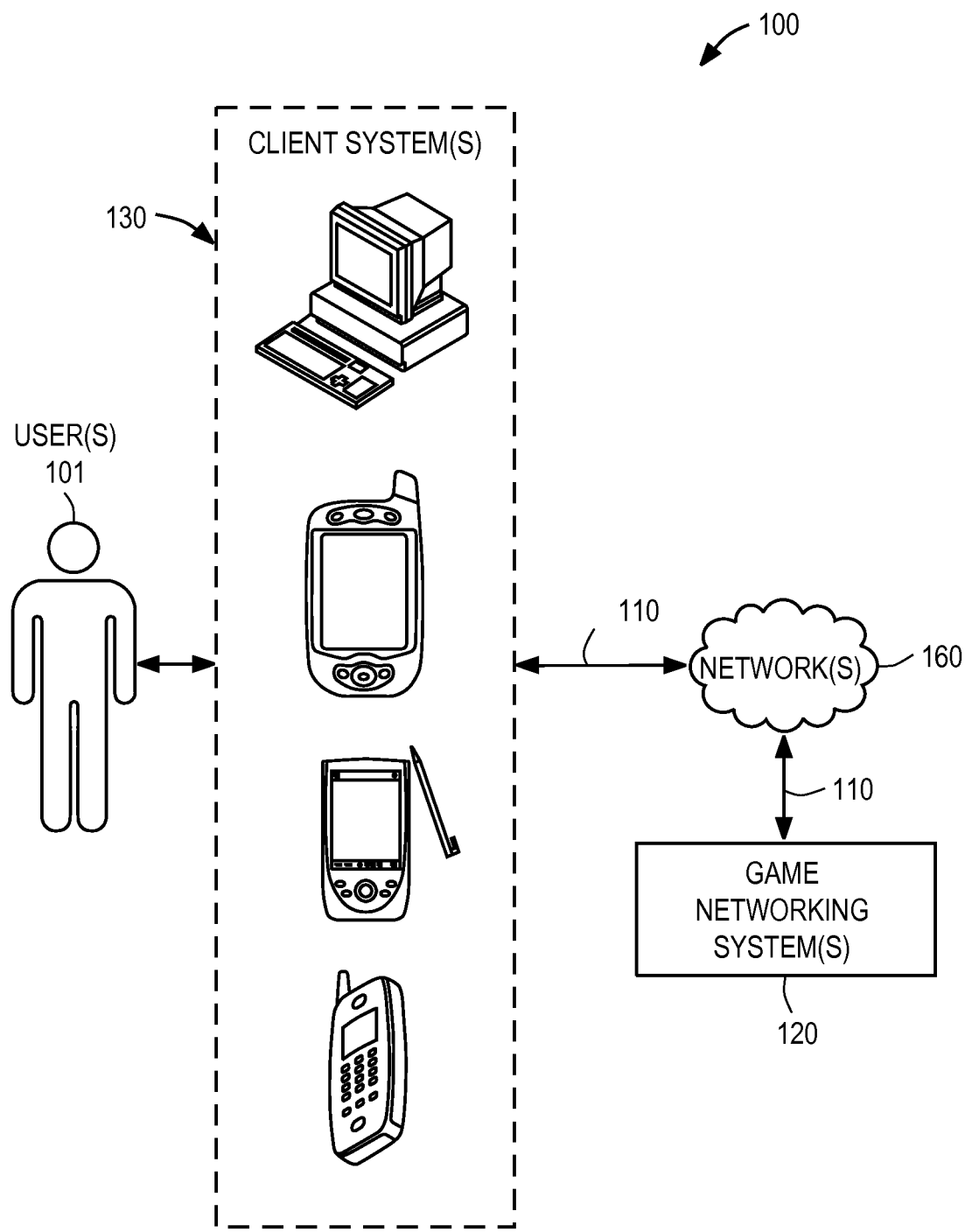
FIG. 1A illustrates an example system configured for implementing various disclosed example embodiments.

In the following description, for purposes of explanation, numerous specific details are set forth in order to provide an understanding of various embodiments of the present subject matter. It will be evident, however, to those skilled in the art that various embodiments may be practiced without these specific details.

Various techniques are described herein for providing game functionality and features related to recommending, establishing, or maintaining connections between various members ("users") of a gaming social network. A gaming social network, further described in the following disclosure, includes a social network of connected users, who are connected as a result of common activities, interests, or interactions, or otherwise in one or more games or a gaming environment.

Many network-connected games typically provide interaction between multiple users, and offer various levels of engagement between cooperative or competitive users and other users with common interests in gaming. Various networked gaming systems offer the ability to connect users (e.g., to "friend" other user-players) to conduct shared game experiences and gaming sessions, but fail to assist a user with game play with users across multiple out-of-game social networks or gaming interfaces. A lack of portability between social networks for network-connected games may result in users reducing the amount of game play, obtaining less enjoyment with game play, or even neglecting or leaving the gaming social network.

An example embodiment described herein provides an efficient platform for game play and access to social networks associated with game play. For example, a social gaming network may automatically associate or assign a game-player with new "neighbors" (e.g., competitors or cooperators) or candidate individuals for in-game gameplay, chat, or other interaction from one or more out-of-game social networks. A game-player's in-game neighbors may be based on the game-player's one or more out-of-game social networks, and the game-player's in-game interactions with other game-players who may or may not be in one of those out-of-game social networks. In an example, a game-player's in-game neighbors may be automatically assigned by selecting individuals from the game-player's one or more out-of-game social networks that have previously or are currently playing the game the game-player is participating in.

An example embodiment, auto-neighboring may be based on how a player is authenticated into the gaming system. Social graphs from multiple social networks (e.g., Yahoo!®, Facebook®, Google+®, e-mail contacts, in-game friends, etc.) may be provided to the gaming system, thereby increasing the size of the player's potential in-game neighbors. In the gaming system the player may access a larger number of friends than would be available from a single social or gaming network, and offer or suggest game-play, gift in-game resources, or perform other game-related interactions independently of how the player and each of the player's neighbors accessed the gaming system.

For example, by being informed of an existing social network connection or relationship, the gaming system may provide an automatic game-player relationship between the connections because gaming system knows both players have an out-of-game connection (e.g., a FACEBOOK friendship). In an example embodiment, an in-game connection may be formed automatically (e.g., without user interaction) based on the imported out-of-game relationship and data indicating that one or more members of the player's social network have previously participated or established an account with the gaming system. Additionally, if multiple game-players have previously accessed the gaming system the gaming system may maintain a database of which one or more games each of the individuals play and suggest coordinated or competitive game play of mutual games that have been previously played by the users when both are connected to the gaming system. A player's in-game enjoyment of a game may be increased by accurately and automatically suggesting friends or neighbors to the player, or by suggesting or automatically linking the player's profile to game players who have a mutual interest in the game the player is playing.

Example System

FIG. 1A illustrates an example system configured for implementing various disclosed example embodiments. In an example, a system 100 comprises user(s) 101, a game networking system(s) 120, a client system 130, and a network 160. The one or more user(s) 101 may also be referred to as one or more player(s); and the player(s) may also be referred to as the user(s) 101. The components of the system 100 may be connected to each other in any suitable configuration, using any suitable type of connection. The components may be connected directly or over the network 160, which may be any suitable network. For example, one or more portions of the network 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

The game networking system(s) 120 is a network-addressable computing system that may host one or more online games. Game networking system 120 may generate, store, receive, and transmit game-related data, such as, for example, game account data, game input, game state data, and game displays. Game networking system 120 may be accessed by the other components of system 100 either directly or via network 160. Player 101 may use client system 130 to access, send data to, and receive data from game networking system 120. Client system 130 may access game networking system 120 directly, via network 160, or via a third-party system. Client system 130 may be any suitable computing device, such as a personal computer, laptop, cellular phone, smart phone, computing tablet, and the like.

Although FIG. 1A depicts a particular number of players 101, game networking systems 120, client systems 130, and networks 160, this disclosure contemplates any suitable number of players 101, game networking systems 120, client systems 130, and networks 160. Although FIG. 1A illustrates a particular arrangement of player 101, game networking system 120, client system 130, and network 160, this disclosure contemplates any suitable arrangement of player 101, game networking system 120, client system 130, and network 160.

The components of system 100 may be connected to each other using any suitable connections 110. For example, suitable connections 110 include wire line (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1A illustrates particular connections between player 101, game networking system 120, client system 130, and network 160, this disclosure contemplates any suitable connections between player 101, game networking system 120, client system 130, and network 160. As an example and not by way of limitation, in particular embodiments, client system 130 may have a direct connection to game networking system 120, thereby bypassing network 160.

Figure 1B:
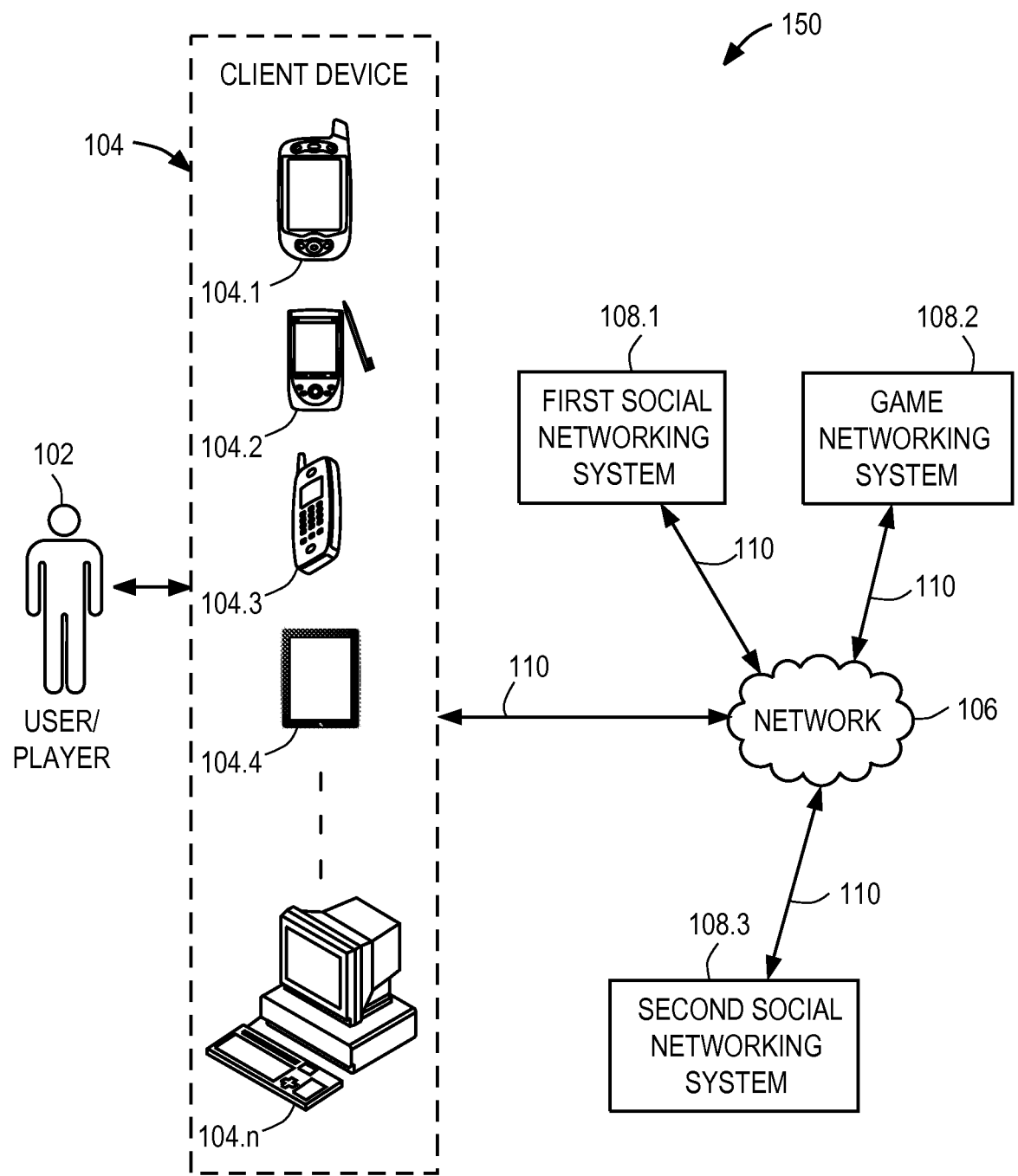
FIG. 1B illustrates an example system configured for implementing various disclosed example embodiments.

FIG. 1B illustrates an example system for implementing various disclosed embodiments. In particular embodiments, a system 150 comprises player 102, a first social networking system 108.1, a game networking system 108.2, a second social networking system 108.3, a client device 104, and a network 106. The components of system 150 may be connected to each other in any suitable configuration, using any suitable type of connection such as connections 110. The components may be connected directly or over a network 106, which may be any suitable network.

The client device 104 may be any suitable computing device (e.g., devices 104.1-104.n), such as a smart phone 104.1, a personal digital assistant (PDA) 104.2, a mobile phone 104.3, a computing tablet 104.4, a personal computer 104.n, a laptop, and the like. The client device 104 may access the first social networking system 108.1 or the game networking system 108.2 directly, via the network 106, or via a third-party system. For example, the client device 104 may access the game networking system 108.2 via the first social networking system 108.1 or the second social networking system 108.3. The client device 104 may be any suitable computing device, such as a personal computer, laptop, cellular phone, smart phone, computing tablet, and the like. The player 102 may use the client device 104 to play the virtual game, and access relevant information of the player and the player's connections in the gaming social network.

First social networking system 108.1 and second social networking system 108.3 may include a network-addressable computing system that may host one or more social graphs (see, for example, FIG. 2) and may be accessed by the other components of system 100 either directly or via the network 106. The social networking system 108.1 and second social networking system 108.3 may generate, store, receive, and transmit social networking data. Moreover, the game networking system 108.2 may include a network-addressable computing system (or systems) that may host one or more virtual games, for example, online. The game networking system 108.2 may generate, store, receive, and transmit game-related data, such as, for example, game account data, game input, game state data, and game displays. The game networking system 108.2 may be accessed by the other components of system 100 either directly or via the network 106. The player 102 may use the client device 104 to access, send data to, and receive data from the first social networking system 108.1, the second social networking system 108.3, or the game networking system 108.2.

Although FIG. 1B illustrates a particular number of players 102, two social networking systems (108.1 and 108.3), game networking systems 108.2, client devices 104, and networks 106, this disclosure contemplates any suitable number of players, social networking systems, and game networking systems, client devices, or networks. As an example, and not by way of limitation, system 150 may include one or more game networking systems 108.2 and no out-of-game social networking systems 108.1 or 108.3. As another example and not by way of limitation, system 150 may include a system that comprises both the first social networking system 108.1 and the game networking system 108.2. Moreover, although FIG. 1*b* illustrates a particular arrangement of player 101, first social network system 108.1 and second social networking system 108.3, game networking system 108.2, client device 104, and network 106, this disclosure contemplates any operable arrangement of players, social network systems, game networking systems, client devices, or networks.

Figure 2:
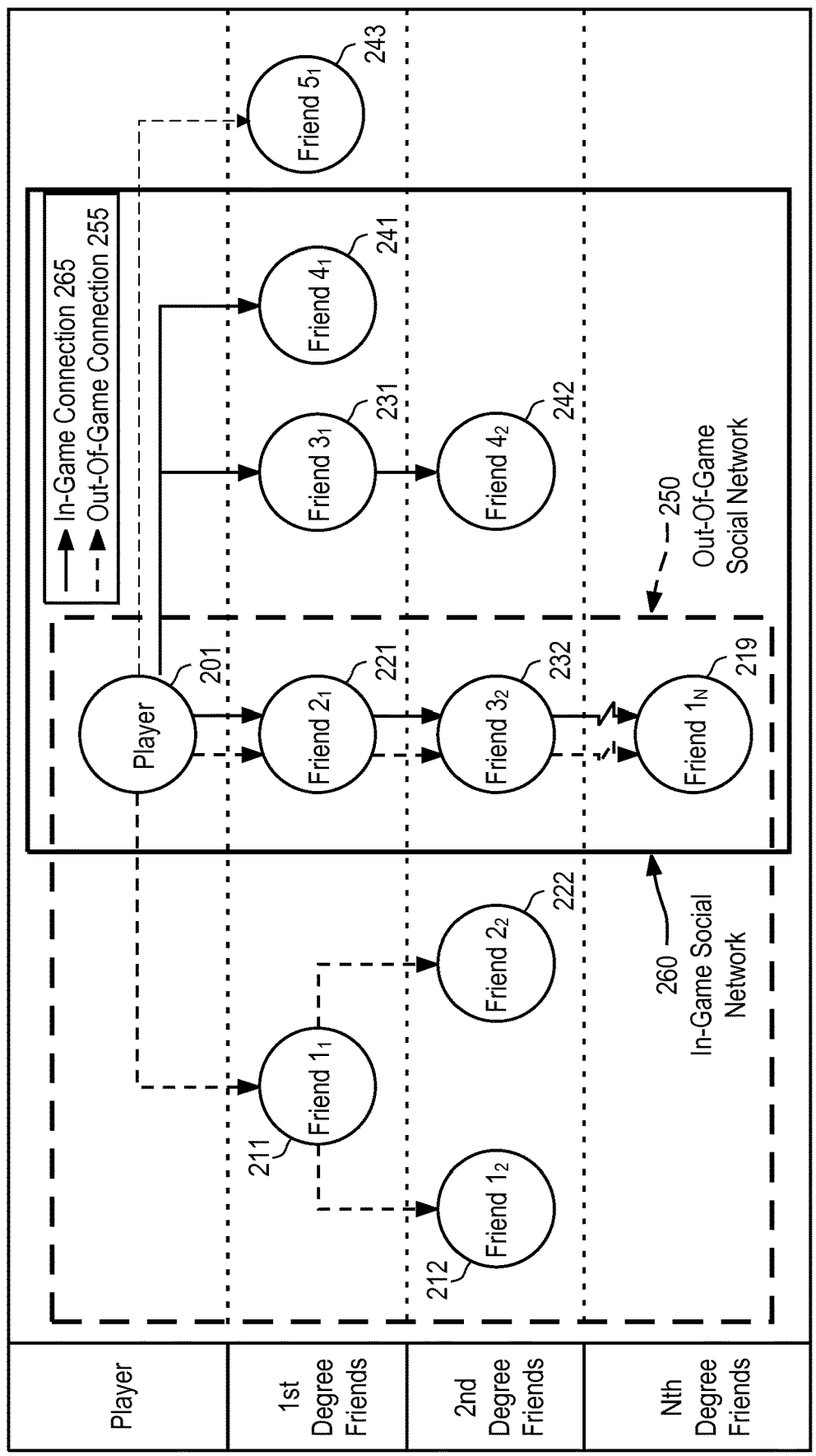
FIG. 2 illustrates an example of an in-game social network and an out-of-game social network within a social graph according to an example embodiment.

FIG. 2 illustrates an example of an in-game social network and an out-of-game social network within a social graph 200 according to an example embodiment. Social graphs are models of connections between entities (e.g., individuals, users, contacts, friends, players, player characters, non-player characters, businesses, groups, associations, concepts, etc.). These entities are considered "users" of the social graph; as such, the terms "entity," and "user" may be used interchangeably when referring to social graphs herein. A social graph may have a node for each entity and edges to represent relationships between entities. A node in a social graph may represent any entity. In an example embodiment, a unique client identifier may be assigned to individual users in the social graph. A social graph may include entities of different types, a combination of entity types, or multiple entities of a single type.

Social graph 200 is shown by way of example to include an out-of-game social network 250 and an in-game social network 260. Portions, or the entire social graph within the social networking systems 108.1 or 108.3, may be managed by a third party. In example embodiments, the first social networking system 108.1 maintains the out-of-game social network 250, while the game networking system 108.2 maintains the in-game social network 260. In-game social network 260 may include one or more players who are friends with player 201 (e.g., friend 231), and may include one or more other players who are not friends with player 201 (e.g., another player in the gaming system selected at random). The social graph 200 may correspond to the various players associated with one or more virtual games and one or more social networking systems. In an example embodiment, each player may "build" their own virtual structures in their own virtual environment to enhance this virtual environment (e.g., to increase the population of a virtual city). When, for example, player 201 visits the virtual environment of friend 231, player 201 may interact with the virtual structures built by friend 231 to earn coins, and to assist player 201 in maintaining his virtual environment.

Therefore, the player 102 may have a social network maintained by both the game networking system 108.2 and the social networking systems 108.1 or 108.3, wherein the player 102 may have a social network on the game networking system 108.2 that is a subset, superset, or independent of the player's social network on the social networking systems 108.1 or 108.3. Additionally, a system may include individuals who are not part of a social networking system, or the in-game social network 260, but are known to player 201 (e.g., friend 243). In such systems, game networking system 108.2 may maintain social graph information with edge-type attributes that indicate whether a given friend is an "in-game friend," an "out-of-game friend," or both. An out-of-game friend may be either a member of a social networking system or identified by other contact information (e.g., an e-mail address, user-id or telephone number).

Further, the game networking system 108.2 may be configured to maintain separate in-game social networks for each or multiple of the number of games offered in the game networking system. For example, a player may select one set of neighbors for game-play in a first game from one or more social or gaming networks, and in a second game the player may select a second set of neighbors for game-play from the same or different social networks. The first and second sets of neighbors may include one or more identical users based on the player's preferences or game-play analysis performed by the game networking system 108.2.

For purposes of simplicity, the present disclosure refers to the in-game social network that may exist for one or more games as the gaming social network, which may be maintained separately from the out-of-game social network. It will be understood, however, that a single provider or business entity may provide both the gaming social network and the out-of-game social network, or provide an interface to the gaming social network directly within an interface to one or more out-of-game social networks. Thus, the game networking system (e.g., providing the gaming social network) and the social networking system(s) (e.g., providing the out-of-game social network) may be operated by the same provider or separate providers.

As FIG. 2 illustrates, some of the social network members and connections may be identical or overlapping between a gaming social network and an out-of-game social network. Separate profiles and user accounts may exist for these overlapping users in each network; and as explained herein, enhanced functionality may be achieved through linking the accounts from the in-game and out-of-game social networks. A clear distinction between the social networks may not be directly evident to users, especially when aspects of the gaming social network are directly delivered through an interface associated with the out-of-game social network. The following examples draw a distinction between operations occurring in the gaming social network and the out-of-game social network, even though features of both social networks may be provided simultaneously within a single graphical user interface. One or more social networks may be virtually merged by assigning a unique identifier to each individual in each social network and attempting to match individuals from multiple social networks to a common user-identifier in a gaming network based on unique attributes (e.g., a common e-mail address associated or registered with two or more social networks or the gaming network).

Figure 3A:
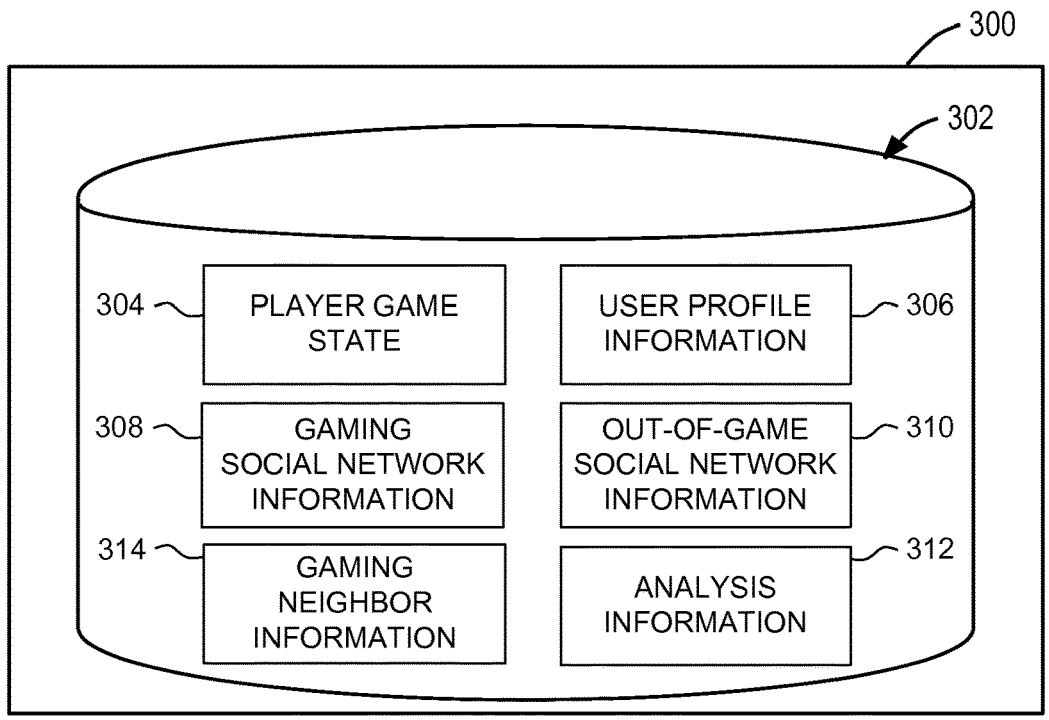
FIG. 3A illustrates an example database system configured to store information related to a gaming social network, according to an example embodiment.

FIG. 3 illustrates an example database system 300 configured to store information in related to a gaming social network according to an example embodiment. In an example embodiment, the database system 300 may correspond to a database maintained within the game networking system 108.2 and, accordingly, is described by way of example with reference thereto. In other example embodiments, the database system 300 may correspond to a separate computer system or information service that may be accessed by the game networking system 108.2 via a computer network (e.g., network 106 of FIG. 1*b*).

The database system 300 may include a database storage 302 that stores information associated with users of the game networking system and the gaming social network. The database system 300 may receive various queries from users and processes of the game networking system related to user profile data, and the database system 300 may process the queries using the database storage 302. In some example embodiments, the database storage 302 may store the following information: a player game state 304, user profile information 306, gaming social network information 308, out-of-game social network information 310, analysis information 312, and gaming neighbor information 314.

Player game state 304 may include information about the player's virtual environment, the player's character, or other game-related information, for one or a plurality of games. For example, player game state 304 may include virtual objects owned or used by the player, placement positions for virtual structural objects in the player's virtual environment, and the like. Player game state 304 may also include in-game obstacles for the player (e.g., new obstacles, current obstacles, completed obstacles, etc.), the player's character attributes (e.g., character health, character energy, amount of coins, amount of cash or virtual currency, etc.), and the like.

In some example embodiments, the user profile information 306 may include user-provided information that is gathered from the player, his or her client device, the gaming social network, the out-of-game social network, or an affiliate social network. The user-provided information may include the player's demographic information, the player's location information (e.g., a historical record of the player's location during game play as determined via a GPS-enabled device or the internet protocol (IP) address for the player's client device), the player's localization information (e.g., a list of languages chosen by the player), the types of games played by the player, authorization to access the player's social networks (e.g., user-id and password combinations), and the like.

Gaming social network information 308 may include information from the gaming social network, including: the player's set of Nth-degree friends; user-generated content that has been generated by the player; user-generated content that has been directed to the player; user-generated content that mentions or makes reference to the player; social actions occurring between the user and others in the gaming social network; user preferences and privacy settings in the gaming social network; and the like.

The out-of-game social network information 310 may include information from one or more affiliate social network(s) of which the player is a member, including: the player's profile information from the affiliate social network; the player's set of Nth degree friends in the affiliated social network; user-generated content that has been generated by the player using the affiliated social network; user-generated content, from a member of the affiliated social network, that has been directed to the player; user-generated content, from a member of the affiliated social network, that mentions or makes reference to the player; and the like.

The analysis information 312 may include information that the game networking system 108.2 may use to interpret the user-generated content, gaming activities, and activities in the gaming social network. For example, this information may include a semantic indicator to correspond to a word or phrase used in the user-generated content, and may include a weighted value that indicates a likelihood for a certain meaning and/or tone (e.g., a likelihood that the player's use of the word "bad" in the user-generated content may be interpreted as "good"). In some example embodiments, the game networking system 108.2 may use the weighted semantic indicators to satisfy a trigger description of a trigger event. For example, the game networking system 108.2 may use the semantic indicators to analyze user-generated content, and based on the semantic indicators that match the user-generated content with a high likelihood, the game networking system 108.2 may determine one or more possible trigger events that indicate in-game events that the player is likely to perform (and determine likelihood values related thereto).

Gaming neighbor information 314 may include information indicating which players from the player's gaming social network information 308 or out-of-game social network information 310 are currently available to play a game, currently playing a game, or otherwise able to interact with the player. This information may originate from either or both of the gaming social network information 308, out-of-game social network information 310, or another source provided by the player. Gaming neighbor information 314 may be automatically generated or updated as other players enter or leave the game networking system 108.2.

Figure 3B:
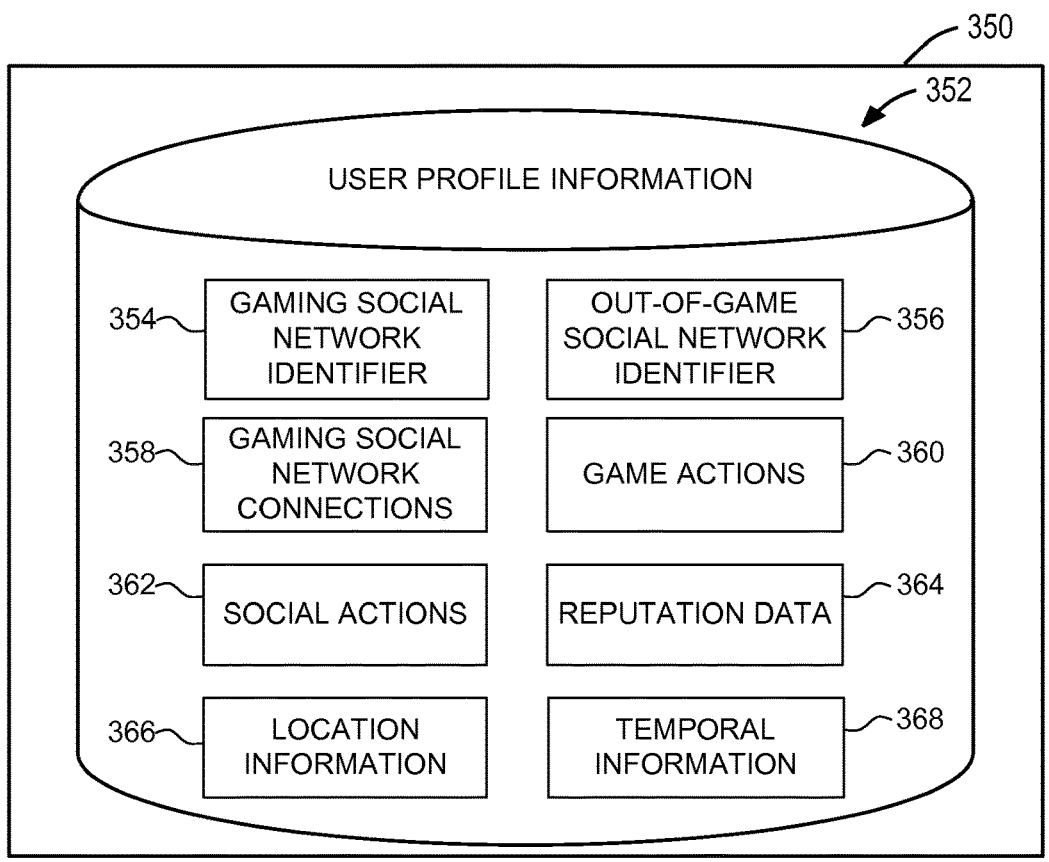
FIG. 3B illustrates an example database system configured to store information related to user profile information for a gaming social network, according to an example embodiment.

FIG. 3B illustrates an example database system 350 configured to store information related to user profile information 352 for a gaming social network, according to an example embodiment. In an example embodiment, the database system 350 may correspond to a database or data store maintained within database system 300, within the game networking system 108.2, or by a separate computer system or information service that may be accessed by the game networking system 108.2.

An example of the types of user profile information 352 that may be maintained within database system 350, include: a gaming social network identifier 354; an out-of-game social network identifier 356; gaming social network connections 358; game actions 360; social actions 362; reputation data 364; location information 366; and temporal information 368.

Specifically, in an example embodiment, data for a gaming social network identifier 354 may be maintained and include one or more nicknames, aliases, or other identifiers (including identifiers that may be unique to a specific game) associated with the user profile. Also in an example embodiment, prior to the user claiming a profile, the social network identifier may be a generic unique user identifier. The data for an out-of-game social network identifier 356 may be maintained in the database system 350 and include identifiers, handles, or aliases for one or more social networking services external to the gaming social network (for example, a FACEBOOK account identifier).

Data for game actions 360 relevant to the gaming social network may be maintained in database system 350, and may include data related to cooperative or adverse game play actions, and other game-related contact occurring between the user and the user's connections in the gaming social network. Data for social actions 362 may include various social interactions occurring within the social network, for example, messages or gaming initiations sent between connections.

Reputation data 364 may be produced from raw or aggregate data related to the user's helpfulness, participation, cooperation, user gaming ratings, or other measures, and may include a score or other measurement of the user's helpfulness to others. For example, the game networking system 108.2 may determine reputation-related information for the player based on user-generated content from the player or his Nth-degree friends (e.g., in-game messages or social network messages), and on the amount of helpful activities (e.g., sending gifts or assisting neighbors in cooperative games) conducted with others.

Data for location information 366 may include user-provided and derived information about the user's known geographical location. Data for temporal information 368 may track the user's times, type, and amount of activity on the game networking system and gaming social network, enabling detailed statistics to be produced regarding various user actions within the game networking system and the gaming social network.

The user profile information for the gaming social network provided by database system 350 may be accessed by any of a number of applications and services operating internal or external to the gaming social network, or the game networking system. For example, the user profile information may be mined for use in connection with user-targeted or connection-targeted promotions and communications by the game networking system. As further described in the following disclosure, the user profile information may be exposed through a variety of GUIs within the gaming social network, the out-of-game social network, the game networking system, and related services.

In an example online computer game, a game engine manages the game state of the game. Game state comprises all game play parameters, including player character state, non-player character (NPC) state, in-game object state, game world state (e.g., internal game clocks, game environment), and other game play parameters. Each user controls one or more player characters (PCs). The game engine controls all other aspects of the game, including NPCs and in-game objects. The game engine also manages game state, including player character state for currently active (e.g., online) and inactive (e.g., offline) players.

An online game may be hosted by game networking system 120, which may be accessed using any suitable connection with a suitable client system 130. A player (e.g., user(s) 101) may have a game account on game networking system 120, wherein the game account may contain a variety of information associated with the player (e.g., the player's personal information, financial information, purchase history, player character state, game state, etc.). In some embodiments, a player may play multiple games on game networking system 120, which may maintain a single game account for the player with respect to all the games, or multiple individual game accounts for each game with respect to the player. In some embodiments, game networking system 120 may assign a unique identifier to each player of an online game hosted on game networking system 120. Game networking system 120 may determine that a player is accessing the online game by reading the user's cookies, which may be appended to Hypertext Transfer Protocol (HTTP) requests transmitted by client system 130, and/or by the player logging onto the online game.

In particular embodiments, player 101 may access an online game and control the game's progress via client system 130 (e.g., by inputting commands to the game at the client device). Client system 130 may display the game interface, receive inputs from user(s) 101, transmit user inputs or other events to the game engine, and receive instructions from the game engine. The game engine may be executed on any suitable system (such as, for example, client system 130, or game networking system 120). As an example and not by way of limitation, client system 130 may download client components of an online game, which are executed locally, while a remote game server, such as game networking system 120, provides backend support for the client components and may be responsible for maintaining application data of the game, processing the inputs from the player, updating and/or synchronizing the game state based on the game logic and each input from the player, and transmitting instructions to client system 130. As another example and not by way of limitation, each time user(s) 101 provides an input to the game through the client system 130 (such as, for example, by typing on the keyboard or clicking the mouse of client system 130), the client components of the game may transmit the player's input to game networking system 120.

In many computer games, there are various types of in-game assets (aka "rewards" or "loot") that a player character may obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles may include tasks, puzzles, opponents, levels, gates, actions, and so forth. In some games, a goal of the game may be to acquire certain in-game assets, which may then be used to complete in-game tasks or to overcome certain in-game obstacles. For example, a player may be able to acquire a virtual key (e.g., the in-game asset) that may then be used to open a virtual door (e.g., the in-game obstacle).

In an online multiplayer game, players may control player characters (PCs) and a game engine controls non-player characters (NPCs) and game features. The game engine also manages player character state and game state and tracks the state for currently active (e.g., online) players and currently inactive (e.g., offline) players. A player character may have a set of attributes and a set of friends associated with the player character. As used herein, the term "player character state" may refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine may assign a unique client identifier to each player.

In particular embodiments, user(s) 101 may access particular game instances of an online game. A game instance is a copy of a specific game play area that is created during runtime. In particular embodiments, a game instance is a discrete game play area where one or more user(s) 101 may interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (e.g., accessible by specific players) or non-exclusive (e.g., accessible by any player). In particular embodiments, a game instance is populated by one or more player characters controlled by one or more users(s) 101 and one or more in-game objects controlled by the game engine. When accessing an online game, the game engine may allow users(s) 101 to select a particular game instance to play from a plurality of game instances. Alternatively, the game engine may automatically select the game instance that users(s) 101 will access. In particular embodiments, an online game comprises only one game instance that all users(s) 101 of the online game may access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be a by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine may interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph may have a node for each entity and edges to represent relationships between entities. A node in a social graph may represent any entity. In particular embodiments, a unique client identifier may be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and the user are directly connected (one edge), they are deemed to be separated by one degree of separation. The user would be a so-called "first-degree friend" of the player. Where the player and the user are connected through one other user (two edges), they are deemed to be separated by two degrees of separation. This user would be a so-called "second-degree friend" of the player. Where the player and the user are connected through N edges (or N−1 other users), they are deemed to be separated by N degrees of separation. This user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system 120). In an example embodiment, Nmax equals 1, such that the player's social network includes only first-degree friends. In another embodiment, Nmax is unlimited and the player's social network is coextensive with the social graph. A player's social network may span multiple social networking systems, each social networking system providing user to the player's social graph that may be unique or overlapping.

In an example embodiment, the social graph is managed by game networking system 120, which is managed by the game operator. In other embodiments, the social graph is part of a social networking system managed by a third-party (e.g., Facebook®, Friendster®, MySpace®, Google+®). In yet other embodiments, user(s) 101 has a social network on both game networking system 120 and social networking systems, wherein user(s) 101 may have a social network on the game networking system 120 that is a subset, superset, or independent of the player's social network on social networking system. In such combined systems, game network system 120 may maintain social graph information with edge type attributes that indicate whether a given friend is an "in-game friend," an "out-of-game friend," or both. The various embodiments disclosed herein are operable when the social graph is managed by the social networking system, game networking system 120, or both.

Figure 4:
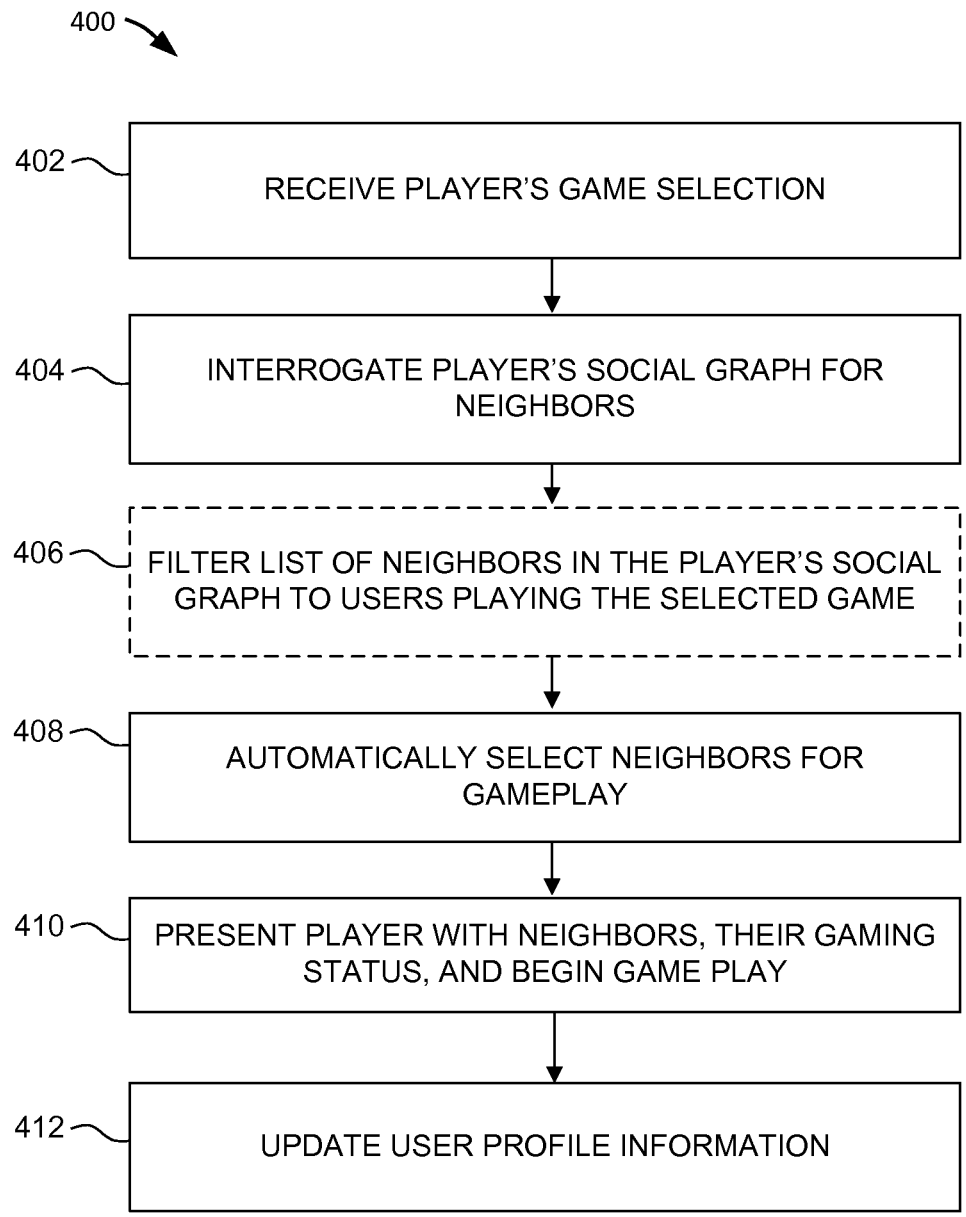
FIG. 4 illustrates a flowchart of an example method for automatically assigning game play neighbours, according to an example embodiment.

FIG. 4 illustrates a flowchart of an example method 400 for automatically assigning play neighbours, according to an example embodiment. Although this method 400 is demonstrated in a sequential fashion, it will be understood that variations to the order and type of information processed in each step may occur in accordance with the embodiments described herein.

In an example, a user (which may also be referred to as a "player") may be presented with a plurality of gaming options. The gaming options may include all of the available games on the gaming networking system or any subset thereof. The gaming options may include an option of joining a neighbor in a game that is in progress. At 402, a gaming system receives the user's game play selection and may begin game-play setup.

At 404, the gaming system may interrogate the user's social graph for potential neighbors to pair the user with in the selected game. For example, the gaming system my access one or more social networks where the user has associated an identity in the social network with the gaming system such that the gaming system may determine if other users (e.g., potential gaming neighbors) have a social relationship with the users. A list of neighbors may be generated from the social graph associated with the user. The user's social graph may include relationship information from one or more social networks or contact information obtained by the gaming system from the user.

At 406, the gaming system may optionally filter the list of neighbors presented to the player to only those neighbors who are currently engaged in playing the game selected by the player. By filtering the list of neighbors the gaming system may increase the relevancy of suggested neighbors who may be willing to cooperate or participate in game play with the user. This may result in greater player satisfaction, success, and enjoyment of the game. In various embodiments, the number of neighbors may be limited to a predetermined value set by the user as a preference setting or the number of neighbors may be dynamically adjusted depending on the size of the player's social graph or the game type.

At 408, the gaming system may automatically select neighbors for gameplay. In an example embodiment the gaming system may select neighbors based on membership in the user's social graph, membership in a social network where the user has a relationship with the neighbor, or the presence of the neighbor in the user's contact information obtained by the gaming system. In an example embodiment the gaming system may select neighbors based on gaming interactions between the user and potential game play neighbors.

At 410, the player may be presented with a list of neighbors including users who are actively playing a game in the gaming networking system, or who are logged into a social networking system and available to join the user in game-play. The list may include the gaming status (e.g., active or inactive). In an example embodiment the gaming system may automatically begin game play after presenting the user with the list of neighbors. In an example embodiment the player may be presented with the option of joining a neighbor in a game that is in progress. In another example embodiment the player may be presented with a list of neighbors from which the player may select one or more neighbors to receive an invitation to begin a new game.

At 412, the gaming system begins game play the system may update the user's user profile information to include information indicating the addition of new neighbors to the user's social graph. In an example embodiment the gaming system may update only a social graph for the user associated with the selected game. In an example embodiment, the gaming system may update the social graph for the user with only other players who are part of the user's social network(s) that are actively or have recently engaged in game play with the gaming system.

Figure 5:
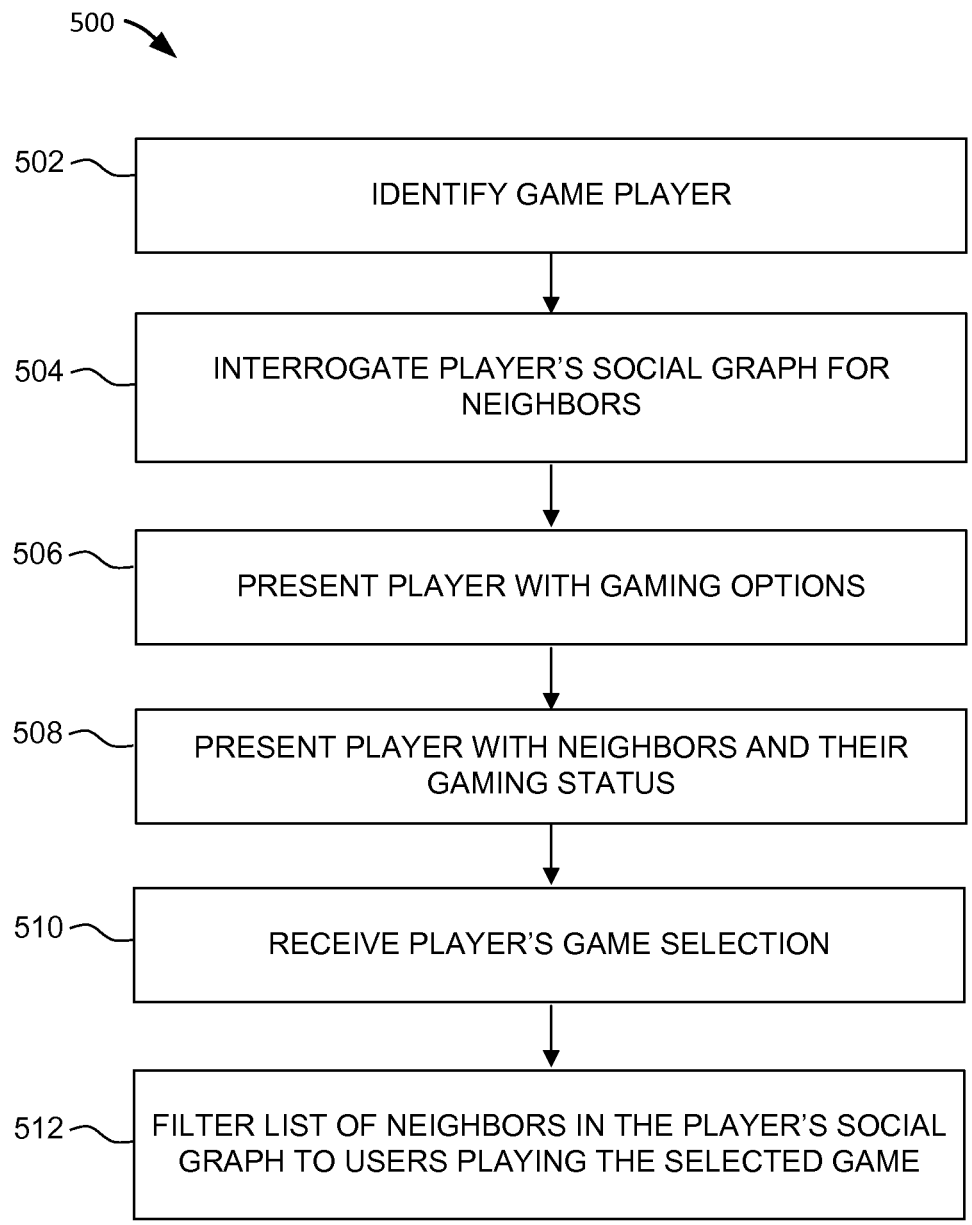
FIG. 5 illustrates a flowchart of a method for determining game play neighbours, according to an example embodiment.

FIG. 5 illustrates a flowchart of an example method 500 for determining game play neighbours, according to an example embodiment. Although this method 500 is demonstrated in a sequential fashion, it will be understood that variations to the order and type of information processed in each step may occur in accordance with the embodiments described herein.

At 502, a gaming networking system may identify a player as having entered or logged-in to the gaming networking system. The player may have accessed the gaming network system directed (e.g., system 108.2) or through any one of a plurality of social networking systems (e.g., systems 108.1 or 108.3) or independently of a social network. In an example, the gaming networking system may present the player with a previous game that is still in progress, or a menu screen presenting the user with a plurality of game options.

At 504, the gaming networking system may interrogate the player's social graph for potential neighbors for game play. The player's social graph may include both an in-game network and one or more out-of game social networks, or other users outside of any social network. In one example, neighbors may be selected by the gaming networking system from the player's social graph based on their degree of closeness to the player in the social graph. For example, in one non-limiting embodiment, only users that are 2nd degree friends with the player may be presented to the user. In another example embodiment potential neighbors may be any other user who the player has previously interacted with in a game in the gaming networking system. Potential neighbors may be actively in a game-play session or may be logged into one of the social networking systems included in the player's social graph.

At 506, the player may be presented with a plurality of gaming options. The gaming options may include all of the available games on the gaming networking system or any subset thereof. At 508, the player may be presented with a list of neighbors including users who are actively playing a game in the gaming networking system, or who are logged into a social networking system and available to join the player in game-play. In an example embodiment the player may be presented with the option of joining a neighbor in a game that is in progress. In another example embodiment the player may be presented with a list of neighbors from which the player may select one or more neighbors to receive an invitation to begin a new game.

At 510, the gaming system receives the player's game play selection and may begin game-play setup. At 512, the gaming system may filter the list of neighbors presented to the player to only those neighbors who are currently engaged in playing the game selected by the player. By filtering the list of neighbors the gaming system may increase the relevancy of suggested neighbors who may be willing to cooperate or participate in game play with the player. This may result in greater player satisfaction, success, and enjoyment of the game. In various embodiments, the number of neighbors may be limited to a predetermined value set by the player as a preference setting or the number of neighbors may be dynamically adjusted depending on the size of the player's social graph or the game type.

Figure 6:
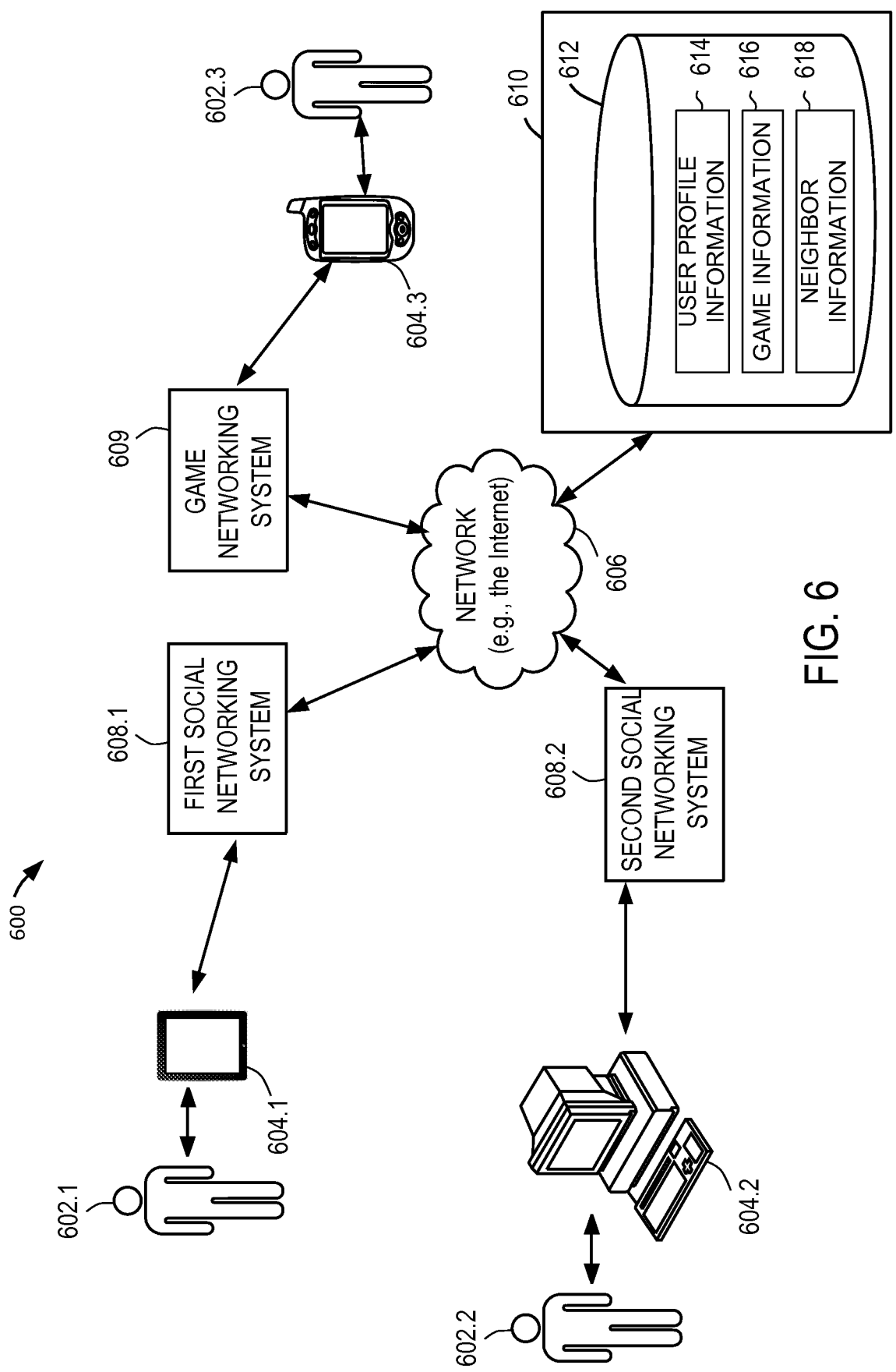
FIG. 6 illustrates a system configured for implementing various disclosed example embodiments.

FIG. 6 illustrates an example of a system for implementing various disclosed embodiments. In particular embodiments, the system 600 comprises multiple neighbors 602, a first social networking system 608.1, a second social networking system 608.2, a game networking system 609, multiple client devices 604 of various types, and a network 606. The components may be connected directly or over network 106, which may be any suitable network, for example the Internet.

An example database system 610 and database 612 configured to store user profile information 614 related to the social graphs of multiple users in game or social networking systems connected to the network 606. In some example embodiments, the database system 610 may correspond to a database or data store maintained within the social network system 608, within the game networking system 609, or a separate computer system or information service that may be accessed by the game networking system 609.

A specific example of the types of user profile information data that may be maintained within database system 610, include user profile information 614 that may be associated with individual users on one or more networking or gaming systems; game information 616 related to current or past gaming activities for each user; and neighbor information 618 that may include relationships between separate users' social graphs. User profile information 614 may include a unique identifier for each user who has accessed game networking system 609 as well as a link between that unique identifier and the user's identity on one or more social networking systems 608. User profile information 614 may also include a summary or complete copy of the user's social graph, including any social graphs imported from a separate social network 608. Game information may include a user's current and past game play statistics and preferences. In an example, neighbor information 618 may include data indicating sets of users that are currently interacting (e.g., logged-on) to game networking system 609 either directly or through a social networking system 608 and may be receptive to coordinated or competitive game play. In another example, neighbor information 618 may include information indicating that individuals in a user's social graph are potential neighbors, preferred neighbors, or blocked individuals. Potential neighbors may be individuals in the user's social graph who are within a preset criteria, (e.g., degree of friendship, or previous game play). Potential neighbors may be individuals a user has indicated are desirable for game play in one or more games, or individuals that a game networking system has determined are recent or regular co-participants in gaming activities. In another example, neighbor information 618 may include a plurality of social graphs obtained from multiple gaming networks or social networks that the user has accessed for game-play, and indications of specific individuals in any one of the plurality of social graphs who have separately or jointly played any of a plurality of games offered by a gaming network.

Figure 7:
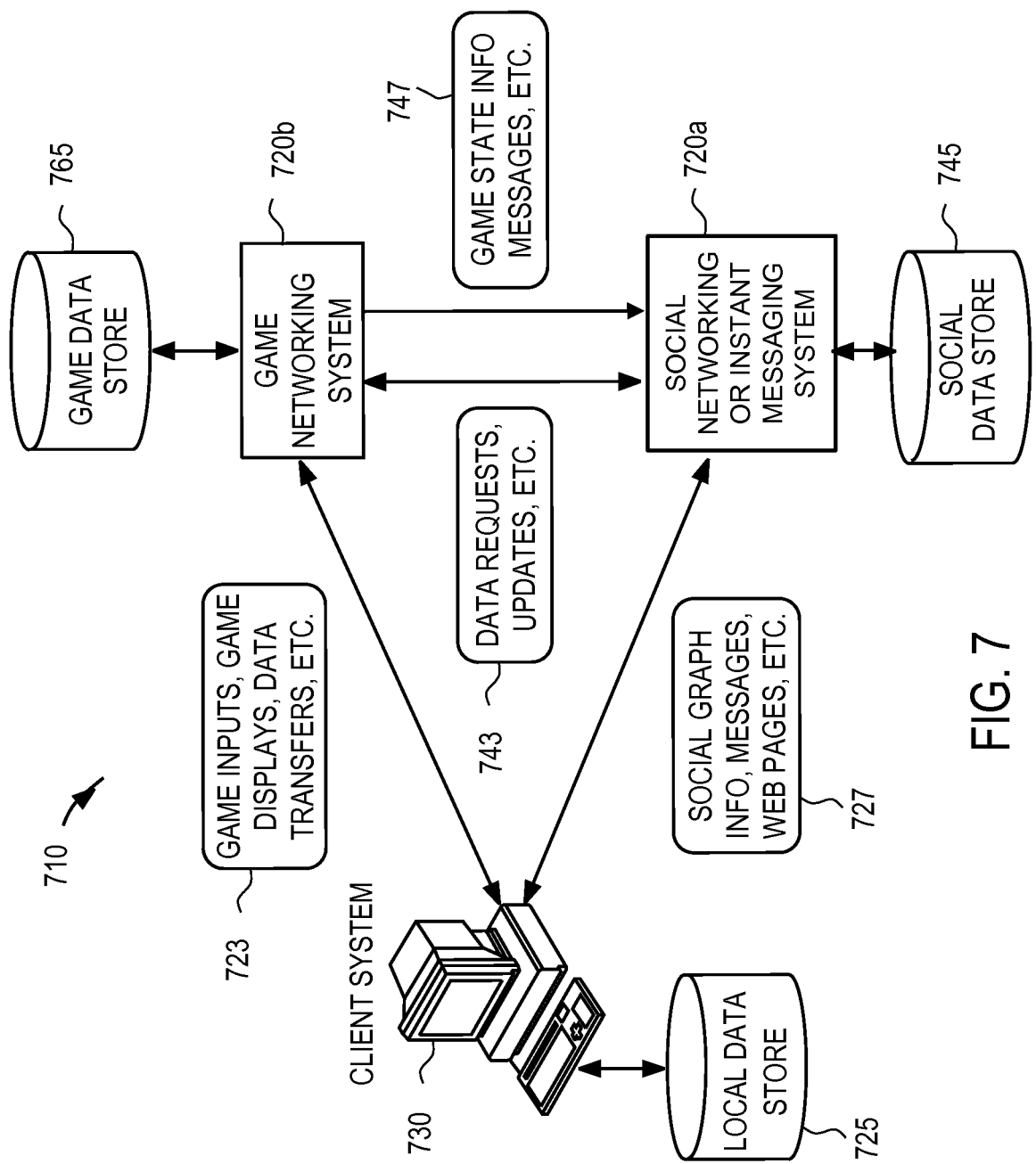
FIG. 7 illustrates a block diagram of an example data flow between the components of a system, according to an example embodiment.

FIG. 7 illustrates a block diagram of an example data flow between the components of system 710. In particular embodiments, system 710 may include client system 730, social networking system 720*a*, and game networking system 720*b*. The components of system 710 may be connected to each other in any suitable configuration, using any suitable type of connection. The components may be connected directly or over any suitable network. Client system 730, social networking system 720*a*, and game networking system 720*b* may each have one or more corresponding data stores such as local data store 725, social data store 745, and game data store 765, respectively. Social networking system 720*a* and game networking system 720*b* may also have one or more servers that may communicate with client system 730 over an appropriate network. Social networking system 720*a* and game networking system 720*b* may have, for example, one or more internet servers for communicating with client system 730 via the Internet. Similarly, social networking system 720*a* and game networking system 720*b* may have one or more mobile servers for communicating with client system 730 via a mobile network (e.g., GSM, PCS, Wi-Fi, WPAN, etc.). In some embodiments, one server may be able to communicate with client system 730 over both the Internet and a mobile network. In other embodiments, separate servers may be used.

Client system 730 may receive and transmit data 723 to and from game networking system 720*b*. This data may include, for example, webpages, messages, game inputs, game displays, HTTP packets, data requests, transaction information, updates, and other suitable data. At some other time, or at the same time, game networking system 720*b* may communicate data 743, 747 (e.g., game state information, game system account information, page info, messages, data requests, updates, etc.) with other networking systems, such as social networking system 720*a* (e.g., FACEBOOK, MYSPACE, etc.). Client system 730 may also receive and transmit data 527 to and from social networking system 720*a*. This data may include, for example, webpages, messages, social graph information, social network displays, HTTP packets, data requests, transaction information, updates, and other suitable data.

Communication 727 between client system 730, social networking system 720*a*, and game networking system 720*b* may occur over any appropriate electronic communication medium or network using any suitable communications protocols. For example, client system 730, as well as various servers of the systems described herein, may include Transport Control Protocol/Internet Protocol (TCP/IP) networking stacks to provide for datagram and transport functions. Of course, any other suitable network and transport layer protocols may be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TEL-NET, and a number of other protocols, may be used. In addition, a server in one interaction context may be a client in another interaction context. In particular embodiments, the information transmitted between hosts may be formatted as HTML documents. Other structured document languages or formats may be used, such as XML, and the like. Executable code objects, such as JavaScript and ActionScript, may also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game may be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 720*b*, the BLOB containing the game state for the instance corresponding to the player may be transmitted to client system 730 for use by a client-side executed object to process. In particular embodiments, the client-side executable may be a Flash-based game, which may de-serialize the game state data in the BLOB. As a player plays the game, the game logic implemented at client system 730 maintains and modifies the various game state parameters locally. The client-side game logic may also batch game events, such as mouse clicks, and transmit these events to game networking system 720*b*. Game networking system 720*b* may itself operate by retrieving a copy of the BLOB from a database or an intermediate memory cache (memcache) layer. Game networking system 720*b* may also de-serialize the BLOB to resolve the game state parameters and execute its own game logic based on the events in the batch file of events transmitted by the client to synchronize the game state on the server side. Game networking system 720*b* may then re-serialize the game state, now modified, into a BLOB and pass this to a memory cache layer for lazy updates to a persistent database.

With a client-server environment in which the online games may run, one server system, such as game networking system 720*b*, may support multiple client systems 730. At any given time, there may be multiple players at multiple client systems 730 all playing the same online game. In practice, the number of players playing the same game at the same time may be very large. As the game progresses with each player, multiple players may provide different inputs to the online game at their respective client systems 730, and multiple client systems 730 may transmit multiple player inputs and/or game events to game networking system 720*b* for further processing. In addition, multiple client systems 730 may transmit other types of application data to game networking system 720*b*.

In particular embodiments, a computed-implemented game may be a text-based or turn-based game implemented as a series of web pages that are generated after a player selects one or more actions to perform. The web pages may be displayed in a browser client executed on client system 730. As an example and not by way of limitation, a client application downloaded to client system 730 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 720*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (e.g., be updated) at any time. When an update to an application datum occurs at client system 730, either caused by an action of a game player or by the game logic itself, client system 730 may need to inform game networking system 720*b* of the update. For example, if the game is a farming game with a harvest mechanic (e.g., ZYNGA FARMVILLE), an event may correspond to a player clicking on a parcel of land to harvest a crop. In such an instance, the application event data may identify an event or action (e.g., harvest) and an object in the game to which the event or action applies. For illustration purposes and not by way of limitation, system 710 is discussed in reference to updating a multi-player online game hosted on a network-addressable system (such as, for example, social networking system 720*a* or game networking system 720*b*), where an instance of the online game is executed remotely on a client system 730, which then transmits application event data to the hosting system such that the remote game server synchronizes the game state associated with the instance executed by the client system 730.

In an example embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 730 may include a Flash client. The Flash client may be configured to receive and run Flash applications or game object codes from any suitable networking system (such as, for example, social networking system 520*a* or game networking system 720*b*). In particular embodiments, the Flash client may be run in a browser client executed on client system 730. A player may interact with Flash objects using client system 730 and the Flash client. The Flash objects may represent a variety of in-game objects. Thus, the player may perform various in-game actions on various in-game objects by making various changes and updates to the associated Flash objects. In particular embodiments, in-game actions may be initiated by clicking or similarly interacting with a Flash object that represents a particular in-game object. For example, a player may interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 730, the Flash client may send the events that caused the game state changes to the in-game object to game networking system 720*b*. However, to expedite the processing and hence the speed of the overall gaming experience, the Flash client may collect a batch of some number of events or updates into a batch file. The number of events or updates may be determined by the Flash client dynamically or determined by game networking system 720*b* based on server loads or other factors. For example, client system 730 may send a batch file to game networking system 720*b* whenever fifty updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 730. In particular embodiments, the batch file may be a text file and the name-value pairs may be in string format.

In particular embodiments, when a player plays an online game on client system 730, game networking system 720*b* may serialize all the game-related data, including, for example and without limitation, game states, game events, and user inputs, for this particular user and this particular game into a BLOB and stores the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 720*b* may retrieve the corresponding BLOB from the database to determine the most-recent values of the game-related data. In particular embodiments, while a player is playing the online game, game networking system 720*b* may also load the corresponding BLOB into a memory cache so that the game system may have faster access to the BLOB and the game-related data contained therein.

In particular embodiments, one or more described webpages may be associated with a networking system or networking service. However, alternate embodiments may have application to the retrieval and rendering of structured documents hosted by any type of network addressable resource or web site. Additionally, as used herein, a user may be an individual, a group, or an entity (such as a business or third party application).

Particular embodiments may operate in a wide area network environment, such as the Internet, including multiple network addressable systems.

Figure 8:
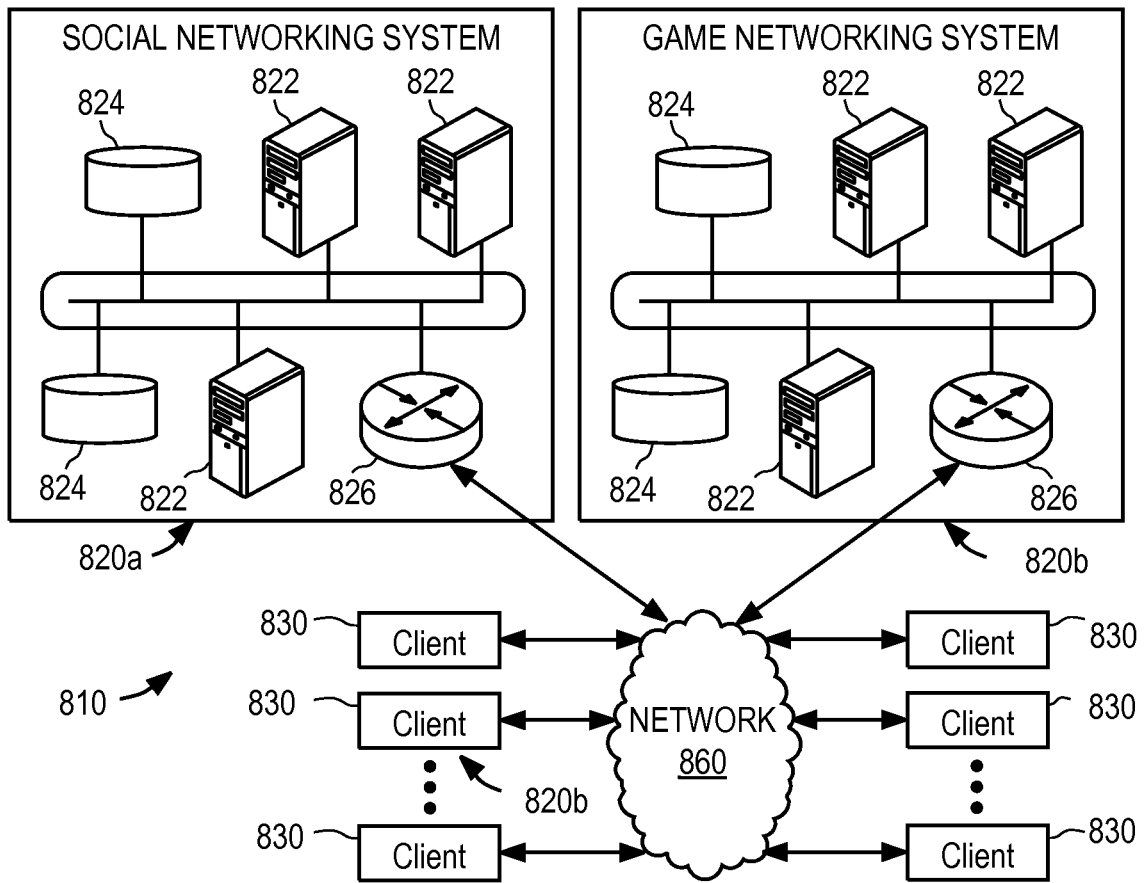
FIG. 8 illustrates a network environment, in which various example embodiments may operate.

FIG. 8 illustrates a block diagram of an example network environment 810, in which various example embodiments may operate. Network cloud 860 generally represents one or more interconnected networks, over which the systems and hosts described herein may communicate. Network cloud 860 may include packet-based WANs (such as the Internet), private networks, wireless networks, satellite networks, cellular networks, paging networks, and the like. As FIG. 8 illustrates, particular embodiments may operate in a network environment comprising one or more networking systems, such as social networking system 820*a*, game networking system 820*b*, and one or more client systems 830. The components of social networking system 820*a* and game networking system 820*b* operate analogously; as such, hereinafter they may be referred to simply as networking system 820. Client systems 830 are operably connected to the network environment via a network service provider, a wireless carrier, or any other suitable means.

Networking system 820 is a network addressable system that, in various example embodiments, comprises one or more physical servers 822 and data stores 824. The one or more physical servers 822 are operably connected to computer network 860 via, by way of example, a set of routers and/or networking switches 826. In an example embodiment, the functionality hosted by the one or more physical servers 822 may include web or HTTP servers, FTP servers, application servers, as well as, without limitation, webpages and applications implemented using Common Gateway Interface (CGI) script, PHP Hyper-text Preprocessor (PHP), Active Server Pages (ASP), Hyper Text Markup Language (HTML), Extensible Markup Language (XML), Java, JavaScript, Asynchronous JavaScript and XML (AJAX), Flash, ActionScript, and the like.

Physical servers 822 may host functionality directed to the operations of networking system 820. Hereinafter servers 822 may be referred to as server 822, although server 822 may include numerous servers hosting, for example, networking system 820, as well as other content distribution servers, data stores, and databases. Data store 824 may store content and data relating to, and enabling, operation of networking system 820 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 824 corresponds to one or more of a variety of separate and integrated databases, such as relational databases and object-oriented databases, that maintain information as an integrated collection of logically related records or files stored on one or more physical systems. Structurally, data store 824 may generally include one or more of a large class of data storage and management systems. In particular embodiments, data store 824 may be implemented by any suitable physical system(s) including components, such as one or more database servers, mass storage media, media library systems, storage area networks, data storage clouds, and the like. In one example embodiment, data store 824 includes one or more servers, databases (e.g., MySQL), and/or data warehouses. Data store 824 may include data associated with different networking system 820 users and/or client systems 830.

Client system 830 is generally a computer or computing device including functionality for communicating (e.g., remotely) over a computer network. Client system 830 may be a desktop computer, laptop computer, personal digital assistant (PDA), in- or out-of-car navigation system, smart phone or other cellular or mobile phone, or mobile gaming device, among other suitable computing devices. Client system 830 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 830 to enter addresses of specific network resources to be retrieved, such as resources hosted by networking system 820. These addresses may be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that may be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 830 desires to view a particular webpage (hereinafter also referred to as a target structured document) hosted by networking system 820, the user's web browser, or other document rendering engine or suitable client application, formulates and transmits a request to networking system 820. The request generally includes a URL or other document identifier as well as metadata or other information. By way of example, the request may include information identifying the user, such as a user identifier (ID), as well as information identifying or characterizing the web browser or operating system running on the user's client computing device 830. The request may also include location information identifying a geographic location of the user's client system or a logical network location of the user's client system. The request may also include a timestamp identifying when the request was transmitted.

Although the example network environment 810 described above and illustrated in FIG. 8 described with respect to social networking system 820*a* and game networking system 820*b*, this disclosure encompasses any suitable network environment using any suitable systems. As an example and not by way of limitation, the network environment may include online media systems, online reviewing systems, online search engines, online advertising systems, or any combination of two or more such systems.

Figure 9:
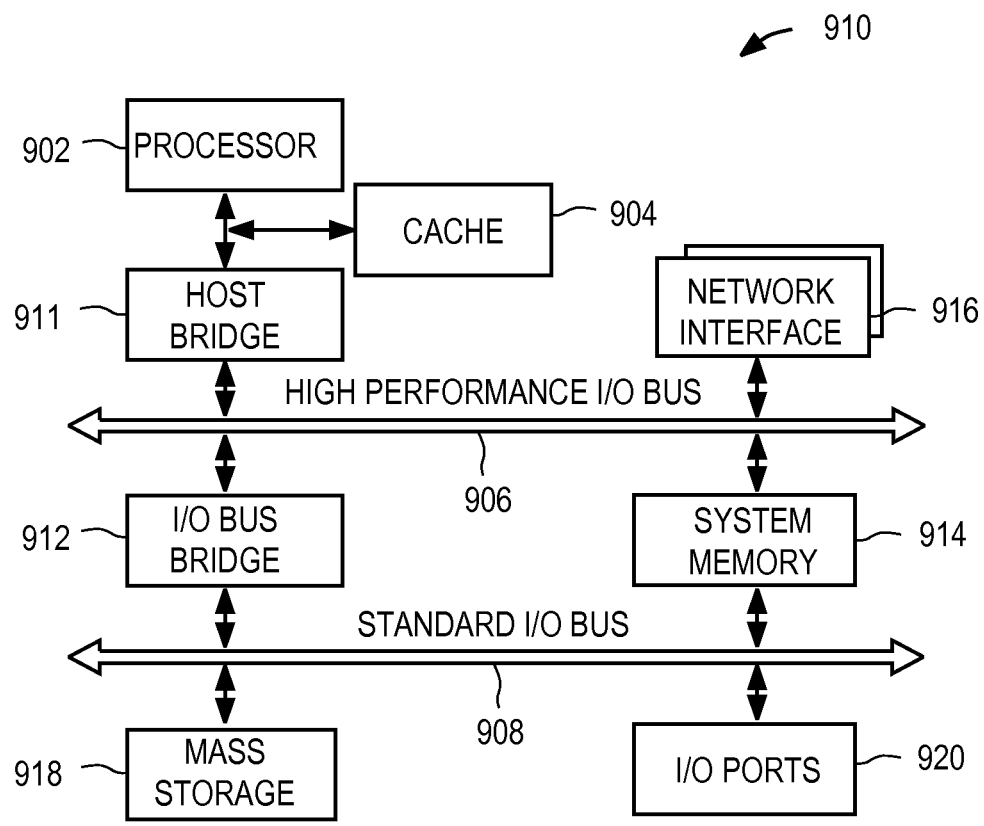
FIG. 9 illustrates an example computing system architecture, which may be used to implement a server or a client system and deploy one or more of the methodologies described herein.

FIG. 9 illustrates an example computing system architecture, which may be used to implement the server 822 or the client system 830 and deploy one or more of the methodologies described herein. In an example, a hardware system 910 comprises a processor 902, a cache memory 904, and one or more executable modules and drivers, stored on a tangible computer-readable medium, directed to the functions described herein. Additionally, hardware system 910 may include a high performance input/output (I/O) bus 906 and a standard I/O bus 908. A host bridge 911 may couple the processor 902 to a high performance I/O bus 706, whereas an I/O bus bridge 912 couples the two buses 906 and 908 to each other. A system memory 914 and one or more network/communication interfaces 916 may couple to the bus 906. The hardware system 910 may further include video memory (not shown) and a display device coupled to the video memory. A mass storage 918 and I/O ports 920 may couple to the bus 908. The hardware system 910 may optionally include a keyboard, a pointing device, and a display device (not shown) coupled to the bus 908. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 910 are described in greater detail below. In particular, the network interface 916 provides communication between the hardware system 910 and any of a wide range of networks, such as an Ethernet (e.g., IEEE 802.3) network, a backplane. The mass storage 918 provides permanent storage for the data and programming instructions to perform the above-described functions implemented in the servers 822, whereas the system memory 914 (e.g., DRAM) provides temporary storage for the data and programming instructions when executed by processor 902. I/O ports 920 are one or more serial and/or parallel communication ports that provide communication between additional peripheral devices, which may be coupled to hardware system 910.

Hardware system 910 may include a variety of system architectures and various components of hardware system 910 may be rearranged. For example, cache 904 may be on-chip with processor 902. Alternatively, cache 904 and processor 902 may be packed together as a "processor module," with processor 902 being referred to as the "processor core." Furthermore, certain embodiments of the present disclosure may not require nor include all of the above components. For example, the peripheral devices shown coupled to standard I/O bus 908 may couple to high performance I/O bus 906. In addition, in some embodiments, only a single bus may exist, with the components of hardware system 910 being coupled to the single bus. Furthermore, hardware system 910 may include additional components, such as additional processors, storage devices, or memories.

An operating system manages and controls the operation of hardware system 910, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit.

Furthermore, the above-described elements and operations may be comprised of instructions that are stored on non-transitory storage media. The instructions may be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

Certain embodiments are described herein may include or be embodied in logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules may provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding", "locating", "permitting" and the like, are executed by game application logic that accesses, and/or causes changes to, various data attribute values maintained in a database or other memory. The present disclosure encompasses all changes, substitutions, variations, alterations, and modifications to the example embodiments herein that a person having ordinary skill in the art would comprehend.

For example, the methods, game features, and game mechanics described herein may be implemented using hardware components, software components, and/or any combination thereof. By way of example, while embodiments of the present disclosure have been described as operating in connection with a networking website, various embodiments of the present disclosure may be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, personal digital assistant (PDA), personal gaming device, etc.), that makes API calls directly to a server. The specification and drawings are, accordingly, to be regarded in an illustrative rather than a restrictive sense. It will, however, be evident that various modifications and changes may be made thereunto without departing from the broader spirit and scope of the disclosure.

What is claimed is:

1. A computer-implemented method, comprising:
  receiving game play information, at a server, from devices coupled to the server, wherein each device is associated with a user of a plurality of users;
  obtaining social graph information retrieved from a first social network and a second social network, the second social network being separate from the first social network and the server;
  receiving a selection of a game from the user;
  in response to the selection of the game, obtaining user profile information including a social graph associated with the user based at least in part on the social graph information from the first social network and the second social network;

maintaining the social graph information retrieved from a first social network and a second social network in a separate social network for the user for each one of a plurality of games offered in a gaming network;

selecting game play neighbors from the plurality of users for the user based on the social graph and the received game play information; and automatically establishing a connection in the social graph between the user and the neighbors playing the game within the gaming network.

2. The method of claim 1, wherein the user profile information includes a contact list provided by the user that is separate from the first social network and the second social network.

3. The method of claim 1, wherein the game play information includes: a history of game play, a game play frequency, a prior favorable gaming outcome, reputation data, or past cooperation or competition with the plurality of users.

4. The method of claim 1, wherein the connection corresponds to a specific game, a specific type of game, or a user criteria.

5. The method of claim 1, further comprising:
filtering a list of the plurality of users to include neighbors playing the game selected;
wherein the filtered list of users is used in the selecting of game play neighbors.

6. The method of claim 5, wherein automatically establishing the connection between the user and the neighbors playing the game is performed by the separate social network for the game.

7. The method of claim 1, wherein selecting game play neighbors from the plurality of users for the user is further based on the game-play state of individual users in the social graph associated with the user.

8. A computing system, comprising:
a memory;
at least one processor coupled to the memory;
the memory including instructions operable to cause the at least one processor to:
receive game play information, at a server, from devices coupled to the server, wherein each device is associated with at least one user of a plurality of users;
receive social graph information associated with the plurality of users from a first social network and a second social network, the second social network being separate from the first social network and the server;
receive a game selection from a user;
in response to the game selection, obtain user profile information from a social graph associated with the user based at least in part on the social graph information from the first social network and the second social network;
maintain the social graph information retrieved from a first social network and a second social network in a separate social network for the user for each one of a plurality of games offered in a gaming network;
select game play neighbors from the plurality of users for the user based on the information obtained from the social graph and the received game play information; and
automatically establish a connection in the social graph between the user and the neighbors playing the game selection within the gaming network.

9. The system of claim 8, wherein the game play information includes: a history of game play, a game play frequency, a prior favorable gaining outcome, reputation data, or past cooperation or competition with the plurality of users.

10. The system of claim 8, wherein the user profile information includes a recommendation preference provided by the user that includes: a geographic location, a geographic proximity, an age range, a degree of connection in the social graph or the gaming network, or a level of the game play participants gaming participation.

11. The system of claim 8, wherein automatically establishing the connection between the user and the neighbors playing the game is performed by the separate social network for the game.

12. The system of claim 8, wherein the connection corresponds to a specific game, a specific type of game, or a user criteria.

13. A non-transitory machine readable storage medium comprising computer-readable instructions, the instructions operable with a computer to:
receive game play information, at a server, from devices coupled to the server, wherein each device is associated with at least one user of a plurality of users;
receive social graph information associated with the plurality of users from a first social network and a second social network, the second social network being separate from the first social network and the server;
receive a game selection from a user;
in response to the game selection, obtain user profile information from a social graph associated with the user based at least in part on the social graph information from the first social network and the second social network;
maintaining the social graph information retrieved from a first social network and a second social network in a separate social network for the user for each one of a plurality of games offered in a gaming network;
select game play neighbors from the plurality of users for the user based on the information obtained from the social graph and the received game play information; and
automatically establish a connection in the social graph between the user and the neighbors playing the game selection within the gaming network.

14. The non-transitory machine readable medium of claim 13, wherein the user profile information includes a contact list provided by the user that is separate from the first social network and the second social network.

15. The non-transitory machine readable medium of claim 13, wherein the game play information includes: a history of game play, a game play frequency, a prior favorable gaming outcome, reputation data, or past cooperation or competition with the plurality of users.

16. The non-transitory machine readable medium of claim 13, wherein the connection corresponds to a specific game, a specific type of game, or a user criteria.

17. The non-transitory machine readable medium of claim 13, comprising computer-readable instructions to: filter a list of the plurality of users to include neighbors playing the game selected; wherein the filtered list of users is used in the selecting of game play neighbors.

18. The non-transitory machine readable medium of claim 13, wherein automatically establishing the connection between the user and the neighbors playing the game is performed by the separate social network for the game.

19. The non-transitory machine readable medium of claim 13, wherein selecting game play neighbors from the plurality of users for the user is further based on the game-play state of individual users in the social graph associated with the user.

* * * * *

UNITED STATES PATENT AND TRADEMARK OFFICE
CERTIFICATE OF CORRECTION

PATENT NO. : 10,552,446 B2  
APPLICATION NO. : 13/782108  
DATED : February 4, 2020  
INVENTOR(S) : Sproule et al.

Page 1 of 1

It is certified that error appears in the above-identified patent and that said Letters Patent is hereby corrected as shown below:

In the Specification

In Column 2, Line 46, delete "Yahoo!®," and insert --Yahoo!®,-- therefor

In Column 2, Line 47, delete "Facebook®," and insert --Facebook®,-- therefor

In Column 2, Line 47, delete "Google+®," and insert --Google+®,-- therefor

In Column 16, Line 4, delete "527" and insert --723-- therefor

In Column 18, Line 10, delete "520a" and insert --720a-- therefor

In Column 21, Line 41, delete "706," and insert --906,-- therefor

In the Claims

In Column 26, Line 3, in Claim 9, delete "gaining" and insert --gaming-- therefor Signed and Sealed this  
Twenty-ninth Day of September, 2020

Andrei Iancu  
*Director of the United States Patent and Trademark Office*